J. G. HATHAWAY.

Cook Stove.

No. 90.

Reissued Nov. 14, 1846.

Sectional View

N. PETERS, Photo-Lithographer, Washington, D. C.

UNITED STATES PATENT OFFICE.

J. G. HATHAWAY, OF BUFFALO, NEW YORK.

IMPROVEMENT IN COOKING-STOVES.

Specification forming part of Letters Patent No. 505, dated December 7, 1837; Reissue No. 90, dated November 14, 1846.

*To all whom it may concern:*

Be it known that I, JONATHAN G. HATHAWAY, formerly of Painesville, in the county of Geauga and State of Ohio, and now of Buffalo, in the county of Erie and State of New York, have invented a new and useful Improvement in the Mode of Applying Heat to Cooking-Stoves; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1:
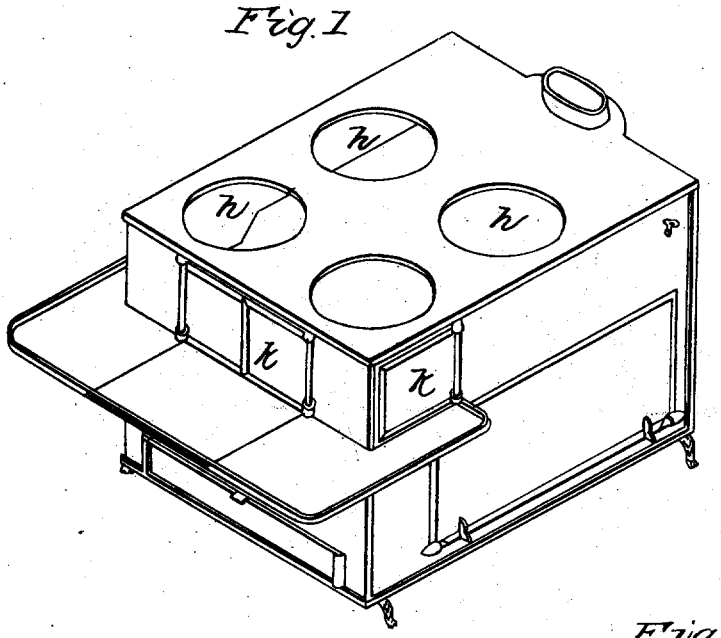
Figure 4:
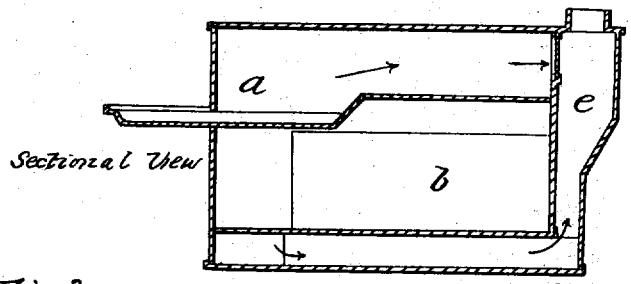
Figure 3:
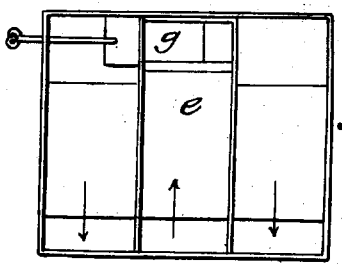
Figure 2:
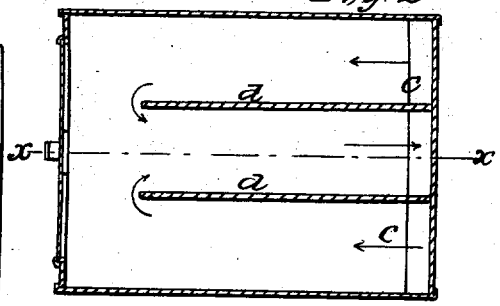

Figure 1 is a perspective view of my improved stove; Fig. 2, a horizontal section taken just below the bottom oven-plate; Fig. 3, a back view, the back plate being removed for the purpose of exhibiting the arrangement of the diving and ascending flues; and Fig. 4, a longitudinal vertical section taken at the line *x x* of Fig. 2.

The same letters indicate like parts in all the figures.

In the specification and drawings attached to and making part of the Letters Patent granted to me for an "improved mode of applying heat to cooking-stoves," bearing date the 7th (the seventh) day of December, in the year 1837, by inadvertence and mistake, and without any fraudulent or deceptive intention, three different modes of applying and distributing heat around the ovens of cooking-stoves are described and represented; and, as I am informed by learned counsel, and verily believe that this renders the said Letters Patent inoperative and invalid, I desire to and do hereby surrender the same and ask that new Letters Patent may be granted to me on the following description and specification, limited to one of the modes described and claimed as my invention in the before-named Letters Patent.

The nature of my said improvement consists in placing the fire-chamber above the oven, when this is combined with a circulating-chamber below for the application and proper distribution of heat, the said chamber being provided with two partial division-plates running in the direction of the greatest length of the stove, and extending from the back to within a short distance of the front, so that the heated products of combustion that pass from the fire-chamber, placed toward one end of the length of the stove, shall descend two diving-flues at the back, and placed on each side of a middle back flue, run along on each side between the side plates and the partial division-plates toward the front of the stove, (or that end which is below the fire-place,) around the ends of the said partition-plates, and return between these two plates to the back, and then up the middle back flue to the exit-pipe.

By arranging the partitions or partial division-plates in the circulating-chamber below the oven in the direction of the length of the stove the heated products of combustion are retained in contact with the bottom of the oven for a greater length of time, and give out more heat in proportion to the capacity of the fire-chamber, (that is limited to the width of the stove,) than if they were placed across the width, which would make them very short and wide, and consequently permit the products of combustion to pass out too freely and give out but little heat to the oven. The fire-place being placed at one end, and the sheet of flame and the gaseous products of combustion passing over the top of the oven toward the back, radiates heat downward to heat the oven, more being given out at the front than back; hence it becomes necessary to equalize this by the proper distribution of heat at the back and bottom, gradually diminishing from the upper part of the back to the front end of the bottom, which is effected by passing the products along the side flues of the back and bottom, and then back through the middle flue to the exit-pipe, the heat during this circuit being gradually diminished, so as to correspond with the inequality of the heat applied to the top, the front receiving its heat by conduction. As the heated products of combustion pass along and through these long passages the combustible gases evolved are consumed by receiving supplies of atmospheric air from the imperfect joints; hence the longer and narrower these flue-spaces are made the more heat will be given out, not only by being longer retained in contact with the oven-plates, but by the combustion of the inflammable gases evolved by the imperfect combustion in the fire-place.

In the accompanying drawings the arrows represent the direction of the draft from the fire-chamber *a* over the oven *b*, down the two diving-flues *c c* at the back, along outside of the partial division-plates *d d* in the circulating-chamber below the oven, around the ends of these plates near the front end of the oven, and back between these plates to the vertical back flue, *e*, between the two diving-flues to the exit-pipe *f*, which is provided with a damper, *g*, for the purpose of carrying the draft directly out, instead of circulating around the oven, when either kindling the fire or when it is not desired to heat the oven. Boiler-holes *h* are made in the top, as usual, to receive culinary implements of any kind desired, and the fire-chamber and oven are provided with doors *i* and *k* in any manner and of any construction desired.

What I claim as my invention, and desire to secure by Letters Patent, is—

Placing the fire-chamber in the upper compartment above the oven, when this is combined with the circulating-chamber below the oven provided with two partial division-plates running in the direction of the greatest length of the stove, and with diving and ascending flues in the back, for the purpose herein described.

J. G. HATHAWAY.

Witnesses:
CHS. M. KELLER,
A. V. BROWNE.